Patented Mar. 20, 1923.

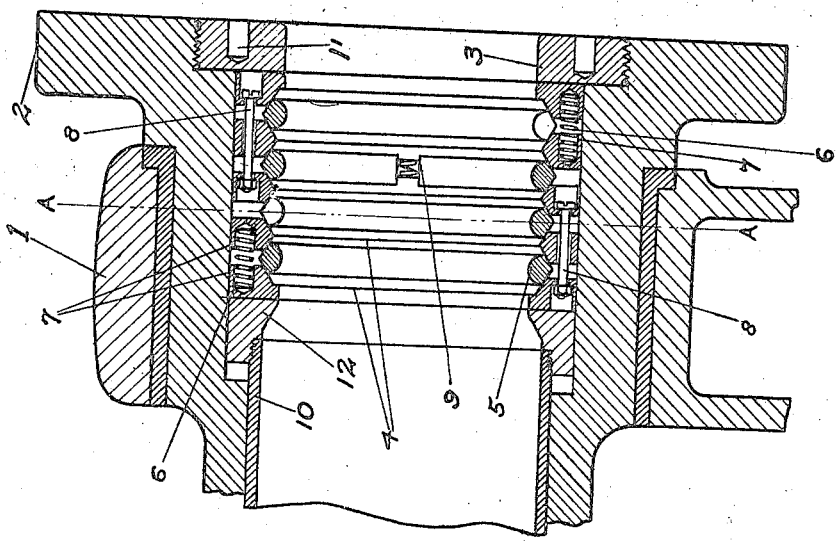
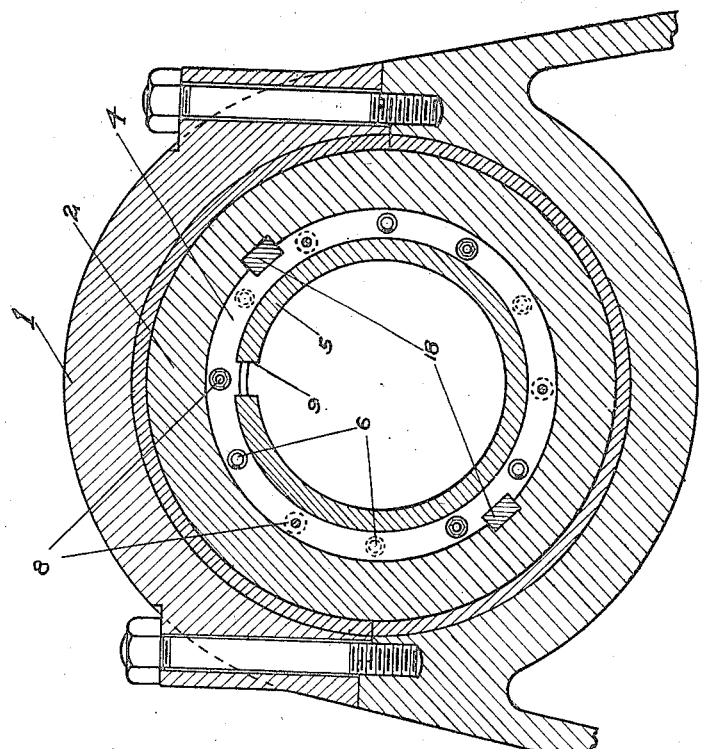

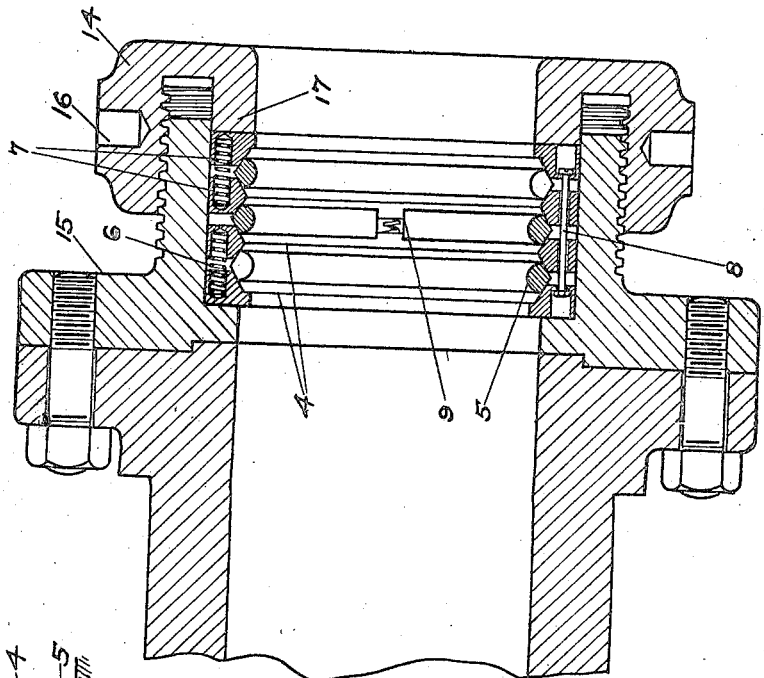

1,448,987

UNITED STATES PATENT OFFICE.

JOHN D. SPALDING AND RICHARD S. JOHNSON, OF BAY CITY, MICHIGAN.

CHUCK.

Application filed November 26, 1919. Serial No. 340,891.

*To all whom it may concern:*

Be it known that we, JOHN D. SPALDING and RICHARD S. JOHNSON, citizens of the United States, residing at Bay City, county of Bay, and State of Michigan, have invented certain new and useful Improvements in Chucks, of which the following is a specification.

Our invention relates to machine chucks of a type particularly adapted for securing work in thread milling operations.

The object of our invention is to provide a machine chuck of hollow spindle construction which will grip the work securely within the spindle and eliminate all external radially adjustable jaws inherent in chucks of previous construction. The construction of our chuck is such that the work is rigidly secured by the contraction of a plurality of gripping rings over the work by the longitudinal thrust of a series of interleaved rings having cam faces.

Another object of our invention is to provide a hollow spindle chuck which will simultaneously grip and center the work by the longitudinal movement of an air actuated piston or the revolution of an advancing screw.

A further object of the invention is to provide means within the hollow spindle of the chuck for gripping the work at a plurality of points along the length and around the entire periphery of the work to insure rigidity in turning work of irregular surface.

Other and further objects of our invention will in part be obvious and will in part be pointed out in this specification with reference to the accompanying drawings in which like characters of reference have been used to designate like parts throughout the several figures.

Figure 1 is a sectional view through the machine chuck arranged for operation by the longitudinal movement of an air actuated piston or other mechanical device.

Fig. 2 is a section of Fig. 1 taken on the line A A.

Fig. 3 is a sectional view of the chuck arranged for manual operation.

Fig. 4 is a sectional view of parts of our invention showing the gripping rings of the chuck closed rigidly over a piece of work of irregular surface.

Fig. 5 is a series of sectional views of various modified forms of gripping rings.

Referring particularly to Fig. 1 of the drawings numeral 1 indicates the frame of a machine lathe forming a bearing for the spindle 2. The spindle is of hollow construction such that the work can be set within the spindle from either end and secured by gripping members carried within the recess of the spindle abutting the removable screw plate 3.

Gripping rings 5 are interpositioned between cam rings 4. These gripping rings are preferably constructed of spring steel and rolled to size in order to fit tightly against the inner faces of the cam rings. The cam rings are normally spaced apart by the tendency of rings 5 to expand and also by springs 6 set within recesses 7 countersunk in the sides of the cam rings. The cam rings with the inner gripping rings are secured together as an entire gripping unit by bolts 8.

The bolts are positioned in the cam rings as represented, passing slidably through one ring and the head and nut secured in countersunk recesses in the rings adjacent thereto. These recesses are provided for clearance in order that the bolt will not project beyond the sides of the cam rings when the rings are compressed. The bolts and springs are alternately arranged about the cam rings, as more clearly shown in Fig. 2, so that the entire series of rings, while spring pressed apart, forms a substantial unit which can be removed from the spindle when plate 3 is unscrewed by inserting a tool in sockets 11.

The gripping rings are cut out on one side, as at 9, to permit of a contraction and expansion upon longitudinal movement of the cam rings.

Several methods may be employed for moving the cam rings longitudinally. For example, as shown in Fig. 1, the tube 10 carrying cylindrical head 12, may be pressed forward by an air actuated piston, compressing the cam rings 4 against the several springs 6 and contracting the gripping rings 5. It will be readily understood that the tube 10 may be moved through the agency of a system of manually operated levers, or, as shown in Fig. 3, the spindle head 14 may be screw-threaded over the spindle 15 and the cam rings compressed by turning head 14 by means of a wrench inserted in sockets 16. The face 17 of the head 14 engages the cam rings as the screw is advanced. The cam rings are secured against revolving in the spindle, when the tool is cutting the work, by means of two keys 18 set within seats formed in the spindle and the series of cam rings.

In chucking a long pipe for thread milling operations the pipe is put through the spindle from the rear and projected sufficiently from the face plate to permit operation of the thread milling tool. Fig. 4 shows a pipe of irregular surface placed in the chuck as above described. The gripping rings move in about the periphery of the work until the pressure distributes in the chuck. Each cam ring is subjected to the same intensity of pressure as the forces within the chuck arrive at complete equilibrium even though the cam rings take varied positions as shown at $a$ and $b$, caused by the irregularities of pipe surfaces. The gripping rings compress until the intensity of pressure P is the same at all points.

Fig. 5 shows the various cross sections of gripping rings which may be employed in the chuck. The ring 5 is in the form of a sector of a circle as assembled in the chucks shown in Figs. 1 and 3; $5^a$ has a flat engaging surface and the usual cam faces; $5^b$ has a biting tooth grip; and $5^c$ is a circular form of gripping ring. The rings may have serrated gripping surfaces to insure a firm grip on the work.

It will readily be understood that the chuck can be adapted for any diameter of work by removing plate 3, in Fig. 1, or head 14, in Fig. 3, withdrawing the complete unit of cam and gripping rings and substituting a unit of different diameter cam and gripping rings.

While we have described our invention in certain specific embodiments it should be understood that modifications may be made within the scope of the appended claims without departing from the spirit of our invention.

Having thus described our invention what we claim and desire to secure by Letters Patent is:

1. The combination in a machine chuck of a live spindle, a work gripping unit carried by said live spindle comprising a plurality of alternately positioned cam rings and metallic gripping rings having permanently machined angularly disposed complementary faces adjacent each other, means for securing said rings together as a removable unit, and means for causing said cam rings to move together longitudinally whereby said gripping rings are brought in operative engagement with the work.

2. The combination in a machine chuck, of a hollow spindle, a work gripping unit therein comprising a plurality of cam rings and a plurality of gripping rings positioned therebetween said cam rings being spaced apart but secured together as a unit by a series of springs and retaining bolts, a removable face plate for said chuck whereby said unit may be exchanged for other units and means for causing longitudinal movement of said cam rings.

3. The combination in a machine chuck, of a live spindle, a work gripping unit carried thereby comprising a plurality of cam rings and a plurality of gripping rings positioned therebetween, said cam rings being resiliently spaced apart but secured together as a unit by a series of springs and retaining bolts alternately positioned around the periphery of said cam rings, a removable face plate for said chuck whereby said unit may be exchanged for other units and means for causing longitudinal movement of said cam rings.

4. In a chuck the combination of a driving spindle and a work gripping unit comprising a plurality of driven rings, expansion springs interposed between said rings and bolts interconnecting said rings alternately between said springs, cam faces on said rings arranged to cooperate with like faces on a plurality of work gripping rings and means whereby said unit may be inserted or removed from said driving spindle.

JOHN D. SPALDING.
RICHARD S. JOHNSON.